United States Patent
Skiba et al.

(10) Patent No.: US 9,232,064 B1
(45) Date of Patent: Jan. 5, 2016

(54) CONTACT CENTER AGENT TRAINING TRAJECTORY

(71) Applicant: Avaya Inc., Santa Clara, CA (US)

(72) Inventors: David Skiba, Golden, CO (US); Valentine C. Matula, Granville, OH (US); George Erhart, Loveland, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/573,417

(22) Filed: Dec. 17, 2014

(51) Int. Cl.
  *H04M 3/00* (2006.01)
  *H04M 5/00* (2006.01)
  *H04M 3/51* (2006.01)
  *G06Q 10/06* (2012.01)

(52) U.S. Cl.
  CPC ..... *H04M 3/5175* (2013.01); *G06Q 10/063112* (2013.01)

(58) Field of Classification Search
  USPC ....................................... 379/265.06, 265.09
  See application file for complete search history.

(56) References Cited

U.S. PATENT DOCUMENTS

| | | | |
|---|---|---|---|
| 8,675,860 B2 | 3/2014 | Eicholz et al. | |
| 2005/0175971 A1* | 8/2005 | Mcilwaine et al. | 434/219 |
| 2010/0250318 A1* | 9/2010 | Paramoure et al. | 705/8 |
| 2014/0050309 A1 | 2/2014 | Teitelman et al. | |

OTHER PUBLICATIONS

U.S. Appl. No. 14/481,684, filed Sep. 9, 2014, Michaelis.

* cited by examiner

*Primary Examiner* — Quynh Nguyen
(74) *Attorney, Agent, or Firm* — Sheridan Ross P.C.

(57) ABSTRACT

Contact center strived to provide needed skills in close proximity to an anticipated demand for the skills. Skills may be needed to replace agents that are reassigned or that are no longer agents of the contact center. Training and recruitment of agents represents a significant investment in time money and other agents for a contact center. Determining a trajectory for a particular candidate to acquire the needed skill, at a point before the contact center fully invests in training, allows the agent to be excluded from future training should the agent not perform as expected were in the performance is measured at least one midpoint towards acquisition of the needed skill. As a benefit, agents can be directed towards acquiring the needed skills from other sources.

20 Claims, 5 Drawing Sheets

CONTACT CENTER AGENT TRAINING TRAJECTORY

FIELD OF THE DISCLOSURE

The present disclosure is generally directed toward operating contact centers.

BACKGROUND

In today's contact centers, agents can have a range of skills. Agents may be hired who have no skills, a skill or two, or a large number of skills. It can be a significant challenge for a contact center administrator to keep up with what kind of skill training and how much skill training is needed for agents, especially in a large, multi-location contact center. The ability of the contact center to provide training can be based on agent skills, market demands, cost, etc. There are additional challenges to match the right amount and pace of training to an agent's ability to learn, especially since people can learn at different rates. Monitoring each agent's progress, proficiency, and aptitude in the trained areas can also prove difficult. Agents also provide significant value when they are scheduled to accept work in the right timeframe after training has been successful.

SUMMARY

It is with respect to the above issues and other problems that the embodiments presented herein were contemplated. Determining cost/value of skill training, skills needed, how agents are progressing through training, near real-time progression, and estimates for future aptitude in training exercises.

In one embodiment, characterization of a contact center agent's training trajectory is provided. Factors to be considered in such a characterization include an agent's ability to learn new topics, rate of learning new topics, rate of perfecting known topics, skills that require training, etc. By doing a periodic analysis, a contact center management system can automatically provide early detection of what is needed as well as forecast how quickly skills will be gained, either on a per-agent basis or on a global contact center basis. The contact center management system can also make suggestions and/or recommendations to a human administrator for interval management, hiring, firing, costs, etc. The contact center management system is operable to match training to an agent's ability, meaning it can provide a periodic assessment for how well training is progressing and create a model for future prediction of learning including ability and time. The information can be used on a per-agent basis and also be used for hiring and potentially for stopping training if the training is ineffective or cost-prohibitive. Using this analysis, the contact center management system can create an overall staffing profile and present said profile to interested human administrators.

In one embodiment, the training state for skills of agents is maintained as a current knowledge level is provided. In addition, the historical progress of all agents/skills is maintained for trajectory computations. Workforce Management (WFM) data may be collected and analyzed on a regular basis to provide the needed skills in the contact center, and a projected timeline for the skills needed in the future.

Three forms of supervisor planning/execution may include:
1. Training Management: Display of agents/skills on path for convergence. This is the predicted trajectory case enabling the supervisor (and potentially the agent or agents) to see the agents who are likely to meet upcoming and/or existing skills. The supervisor uses this mode to decide if training should be initiated, stopped, or continued in the current form.
2. Training Initiation: From the view of skill percentages and historic rate of training for other skills, the invention can create and present a predictive list of agents most likely to train the fastest for a given skill need.
3. Training Contingency: A supervisor may select multiple agents to train on a specific skill when only one may be needed. This mode of the invention monitors and reports on the "race" to train. As the agents progress, the invention may predict and suggest the potential winner through pace comparison through one or more iterations. The supervisor may at some point stop the "race" and select which agent will continue on with the final training to completion. The others have an increased proficiency and may resume training at another time as the business needs permit.

In a non-limiting example, the system can forecast when an agent can go live:

If an agent learns 20% of a skill this week and 20% next week, the system can determine that scheduling this agent in a few weeks for that skill will likely be successful.

If an agent learns 20% of a skill this week but only 10% next week, the system can determine that scheduling this agent to cover that skill in a month or six weeks, rather than in a few weeks.

The supervisor can be alerted by the system that this skill was needed six weeks ago, based on information from this system that has been fed into a work force management system. The supervisor can be interviewing two agents while watching the progression of training Based on a determined trajectory, it could take twice as long or an agent could be ready sooner than a new hire.

In another example, a supervisor may treat training as a race. If agent A is significantly faster than agent B, the supervisor may terminate training for agent B since it is cheaper to train agent A. If a group of agents is being trained, say 100, the supervisor may decide to continue with the 50 agents who have the best trajectory.

The supervisor is easily able to determine when an agent will be proficient and how that agent is doing relative to the model (e.g., takes too long, too expensive, fast learner, consistently beats predictions, etc.).

In one embodiment, a server is disclosed, comprising: a memory that stores accessible data and instructions; a network interface that interconnects the server to network components via a communication network; and a processor performing: accessing, at a first time and via the network interface, a needed skill for a contact center, a time needed for the needed skill to be available to the contact center, and a first estimated midpoint of a first skill acquisition program; accessing, by the network interface, a pool of candidates; selecting a first candidate, from the pool of candidates, to provide the needed skill to the contact center upon completion of the first skill acquisition program; receiving an observed midpoint proficiency of the first skill acquisition program; comparing the first estimated midpoint with the observed midpoint proficiency; and upon the compared first estimated midpoint and actual midpoint indicating a deficiency, discontinuing the first skill acquisition program.

In another embodiment, system for providing a needed skill to a contact center is disclosed, comprising: means for accessing the needed skill, the time needed for the skill to be available to the contact center, and a first estimated midpoint; means for accessing a pool of candidates; means for selecting a first candidate, from the pool of candidates, to provide the needed skill to the contact center upon completion of the first skill acquisition program; means for receiving an observed midpoint proficiency of the first skill acquisition program; means for comparing the first estimated midpoint with the observed midpoint proficiency; and upon the compared first estimated midpoint and actual midpoint indicating a deficiency, means for discontinuing the first skill acquisition program.

In yet another embodiment, a processor configured to perform actions is disclosed, comprising: accessing, at a first time and via the network interface, a needed skill for a contact center, a time needed for the needed skill to be available to the contact center, and a first estimated midpoint of a first skill acquisition program; accessing, by the network interface, a pool of candidates; selecting a first candidate, from the pool of candidates, to provide the needed skill to the contact center upon completion of the first skill acquisition program and wherein the first candidate is either (i) an agent of the contact center but does not possess the needed skill at the first time or (ii) is not an agent of the contact center at the first time; receiving an observed midpoint proficiency of the first skill acquisition program; comparing the first estimated midpoint with the observed midpoint proficiency; and upon the compared first estimated midpoint and actual midpoint indicating a deficiency, discontinuing the first skill acquisition program.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
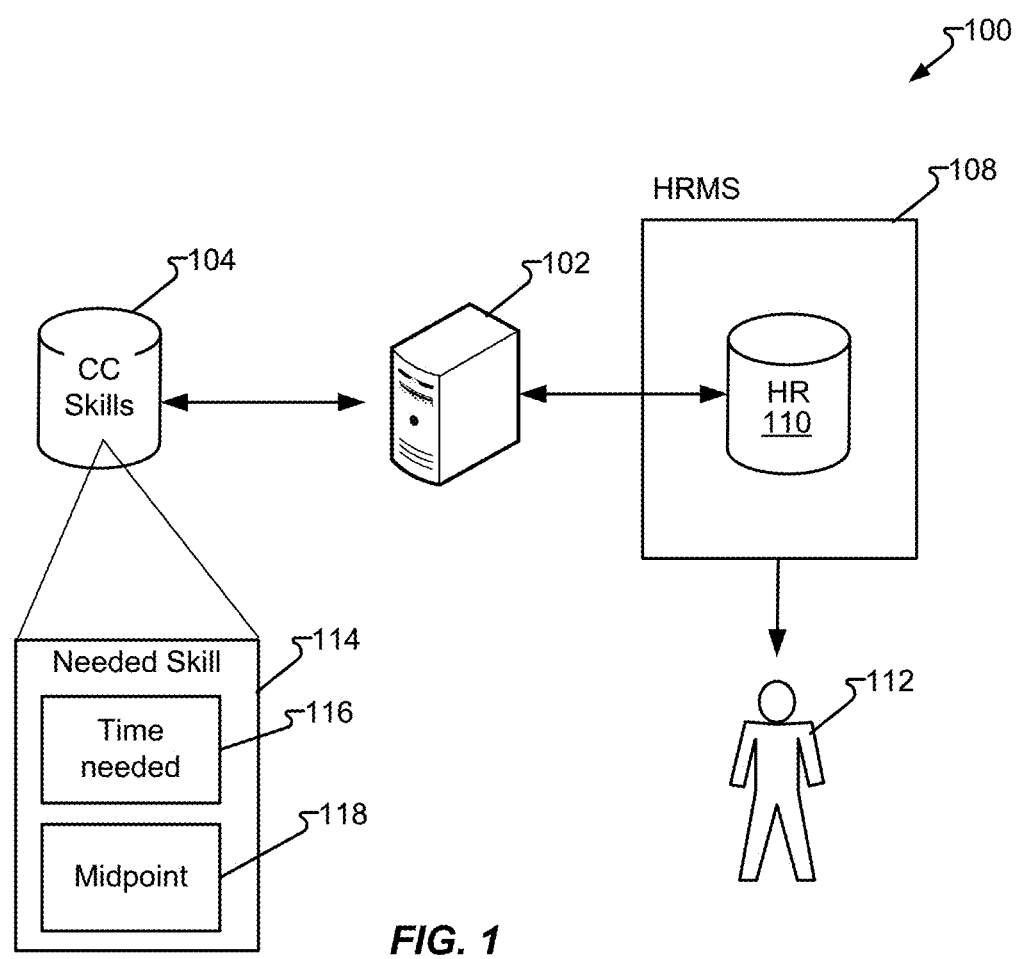
FIG. 1 depicts a contact center system in accordance with embodiments of the present disclosure.

FIG. 1 depicts a contact center system 100 in accordance with embodiments of the present disclosure. In one embodiment system 100 is implemented in a contact center and comprises components in, or in communication with, the contact center. Server 102 provides processing and memory for the contact center server 102 and may incorporate or access one or more databases such as contact center skills 104. Server 102 may then interface with human agent management system 106, and human agent database 110 associated therein, whereby human agent management system 108 operable to assign agent 112 to tasks, such as work item and training activities.

Server 102 is variously embodied and may incorporate or access memory and/or one or more processors. Server 102 comprises a network interface operable to facilitate communication with contact center skills database 104, human agent management system 108, and other components of a contact center. Server 102, and the network interface therein, may communicate with other systems such as a management terminal or other means in which agent 112 may receive work instructions and/or a supervisor may be notified of work instructions for agent 112 or recommended work instructions for agent 112.

Server 112 comprises at least one processor operable to access at a first time and via the network interface and needed skill for the contact center. Furthermore the needed skill may comprise a time needed in which the needed skill is expected to be available.

Needed skill 114 is illustrated as a record of contact center skills 104. In other embodiments needed skill 114 may be directly input from a supervisor's terminal, other database, and/or other system. In one embodiment needed skill 114 comprises time needed 116 and midpoint 118. Time needed 116 may be a date and/or duration. Midpoint 118 indicates an attribute associated with acquiring needed skill 114 to the contact center. Midpoint 118 may be time-based and or skill-based. For example, midpoint 118 may be time-based such as agent 112 acquiring a first portion of the needed skill 114 at a certain time and or agent 112 having a measured attribute and/or proficiency at a certain time. The certain time may be calendar based time-based and/or array situation where agent 112 is the first to achieve midpoint 118 compared to other agents.

Agent 112 may be selected as the only candidate or from a pool of candidates, comprising at least a first and second candidate, to receive training and/or recruitment in accord with the skill acquisition program. When selecting agent 112 from a plurality of candidates, various methodologies may be employed. In one embodiment, a candidate is selected based upon an estimated skill acquisition trajectory whereby the selected candidate is predicted to acquire the needed skill, and thereby provide the needed skill for the contact center, at the time needed or within an acceptable lead time. For example, a particular skill acquisition program is a training program taking three months. The candidate is expected to have a loss of retention of five percent per week, but the needed skill is only eighty percent of the retained skill predicted upon completion of the training program. Accordingly, the candidate can initiate the training program at some point between three months prior to the time needed (e.g., training ends at the same time the needed skill is expected to be available) and three months and four weeks prior to the time needed (e.g., training ends plus the maximum time permitted to have a retention loss that is deemed acceptable).

In another embodiment the specific skill acquisition program is selected to provide the needed skill at the time needed 116. For example, training program A takes two hours a day, five days a week, for ten weeks (one hundred hours), wherein the candidate is available for other tasks such as work items during the majority of the work day, and training program B, which takes five hours a day, five days a week, for four weeks (one hundred hours), however the candidate has less availability for other tasks during the training program.

In yet another embodiment, the candidate is selected in accord with an estimated midpoint skill being above a threshold, such as the estimated midpoint skill of a candidate not selected (e.g., the candidate having the next best estimated midpoint skill). And it still another embodiment, the candidate is selected based upon an observed midpoint skill. The observed and estimated midpoint skill may be a proficiency at a certain time or upon completion of a certain event (e.g., candidate states that they have completed the home study course) to determine, for example, who has the best observed skill acquisition trajectory. Therefore, the observed skill acquisition midpoint determines, for example, who learned more as measured on week ten. In another embodiment, the skill proficiency is measured, such as by key performance indicators (KPI) and the candidate who achieves an observed skill acquisition midpoint above a threshold first is permitted to advance over at least one candidate who has not achieved the threshold observed skill acquisition midpoint. Therefore, the observed skill acquisition midpoint determines, for example, who first acquired fifty-percent proficiency.

An estimated skill acquisition trajectory for a particular candidate may be determined based on known skills of the candidate, and their associated precipice nature to acquire the needed skill. For example, if the needed skill is "international flight reservations" and the candidate is well versed in "domestic flights including Alaska, Hawaii, and the American territories" may have a more favorable (e.g., faster, less time required, fewer errors, etc.) trajectory than another candidate who is only skilled in, "regional flight reservations."

Figure 2:
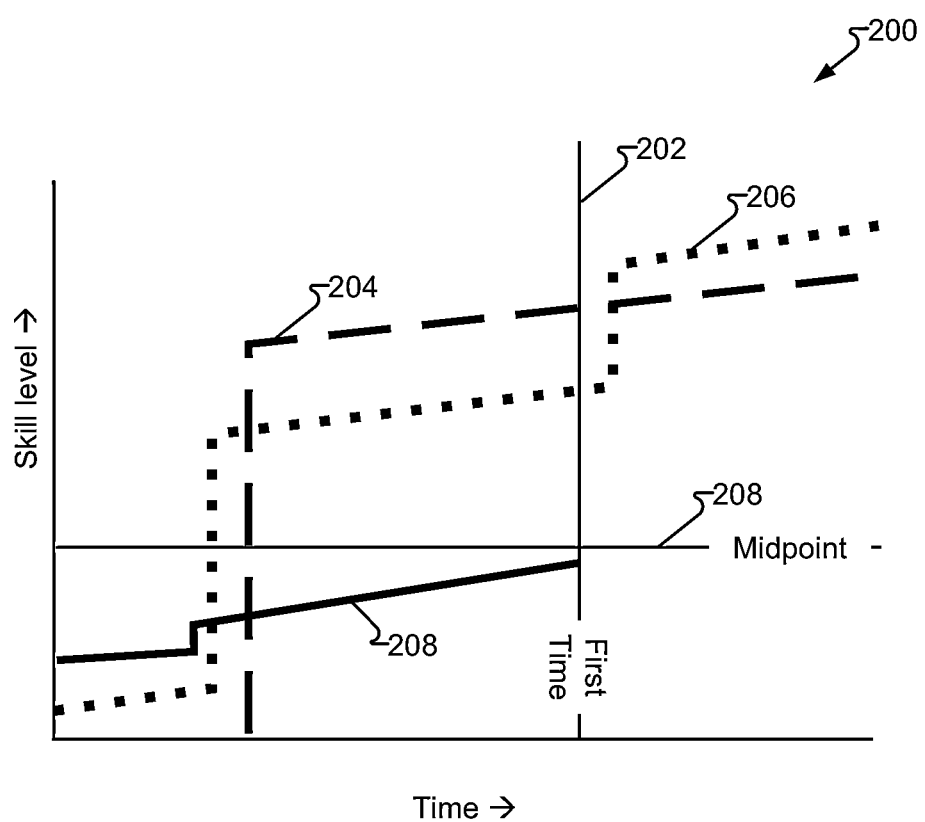
FIG. 2 depicts a graph in accordance with embodiments of the present disclosure.

FIG. 2 depicts graph 200 in accordance with embodiments of the present disclosure. Graph 200 illustrates the passage of time on the x-axis and the skill level on the y-axis. In one embodiment graph 200 comprises midpoint 208. Graph 200 may also comprise first time 202. In one embodiment graph 202 illustrates the progress of three candidates to provide needed skill 114 to the contact center. In one embodiment candidates who do not achieve proficiency associated with midpoint 208 by first time 202 may have their skill acquisition program terminated and may further be reassigned to other tasks.

In one embodiment line 204 represents a new hire and/or new contractor being recruited to work in the contact center. The agent illustrated by line 204 is not presently an agent of the contact center but upon hiring the associated agent's line 204 indicates a skill level at first time 202 above midpoint 208 and therefore the associated agent may be selected continue with a skill acquisition program. Agent 206 illustrates an agent who is initially an agent of the contact center and, via a skill acquisition program, achieves various levels of proficiency over time including proficiency above midpoint 208 at first time 202. Accordingly the agent associated with line 206 may continue with the skill acquisition program.

In another embodiment, line 208 represents an agent, who is at a first time is an agent of the contact center, and subject to the skill acquisition program. The agent associated with line 208 achieves an increase in skill level over time however line 208 indicates a proficiency at first time 202 below midpoint 208. Accordingly the agent associated with line 208 may be terminated from the continuing the skill acquisition program and may be further reassigned to other tasks.

As illustrated in FIG. 2, the acquisition of skill needed 114 may be accomplished by various means. In one embodiment skill acquisition program is a training program for an agent 112 who is already an agent of the contact center. In another embodiment agent 112 has the needed skill but is not presently an agent of the contact center space and therefore skill acquisition program is a recruiting program designed to hire and or retain the contracting services of agent 112 (e.g., advertising, screening applications, interviews, offer, acceptance, etc.).

Figure 3:
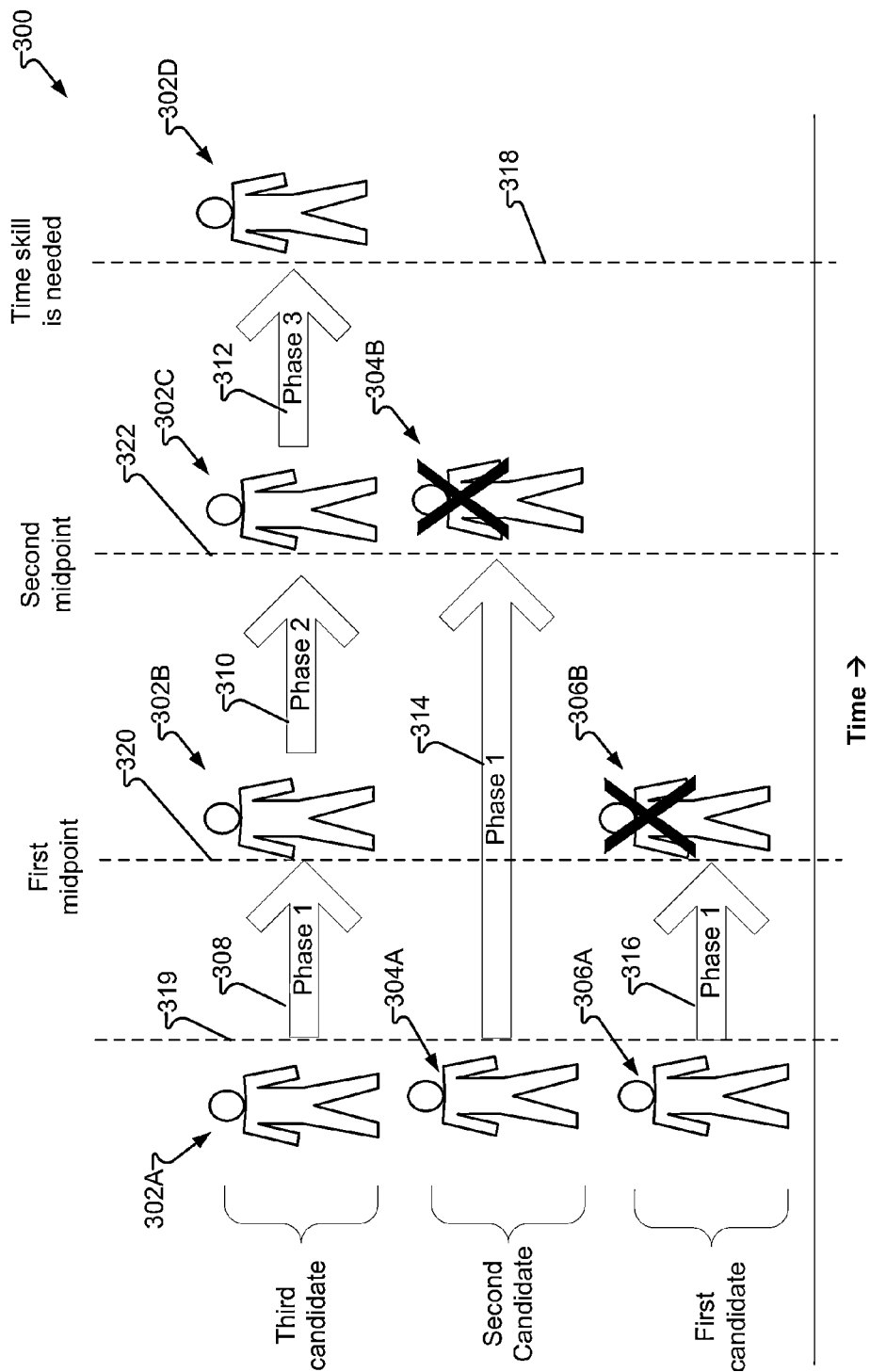
FIG. 3 illustrates a first skill acquisition program in accordance with embodiments of the present disclosure.

FIG. 3 illustrates skill acquisition program 300 in accordance with embodiments of the present disclosure. In one embodiment skill acquisition program 300 is based, at least in part, on midpoints 320, 322 being fixed in time or event to determine an observed skill proficiency midpoint. Skill acquisition program 300 illustrates three candidates 302, 304, 306.

Skill acquisition program 300 includes first midpoint 320 and second midpoint 322. With a time needed 116 at needed time 318. In one embodiment, first candidate 306 starts at first time 319 as candidate 306A and proceeds through phase 1 (316) to be first candidate 306B. First candidate 306B at first midpoint 320 has an observed midpoint proficiency. The observed midpoint proficiency of candidate 306B, at first midpoint 320, is determined to be deficient. Accordingly, candidate 306 is discontinued from further participation of skill acquisition program 300, upon which, candidate 306 may be reassigned to other tasks.

In another embodiment, second candidate 304 starts at first time 319 as second candidate 304A. First candidate 304A is subject to skill acquisition program 300 after which candidate 304A becomes candidate 304B. Phase 1 (314) is different from phase 1 (316, 308) and candidate 304B does not have an associated observed skill proficiency at first midpoint 320. However, at second midpoint 322 it is determined to be deficient with respect to an observed midpoint proficiency at second midpoint 322. Accordingly, candidate 304B may be discontinued from any further participation in skill acquisition program 300, upon which, candidate 304 may be reassigned to other tasks. Discontinuation from training may embody an attribute change in a database indicating discontinuation, the removal/absence of an attribute indicating continuation of training, removal of indicia of candidate 304 from a database of continuing candidates, and/or other means for associating candidate 304 as not continuing training or removal from the pool of candidates who are selected for continuation of training.

In another embodiment third candidate 302 is third candidate 302A at a first time. Third candidate 302A is subject to skill acquisition program 300 comprising phase 1 (308) which may or may not be the same or similar to phase 1 (316). Third candidate 306, following phase 1 (308), becomes third candidate 302B at first midpoint 320. Third candidate 302B continues with the skill acquisition program 300 including phase 2 (310) to become third candidate 302C as having observed skill proficiency determined to be sufficient at second midpoint 322. Third candidate 302C is then selected to continue skill acquisition program 300 phase 3 (312) to become third candidate 302D and thereby provide the needed skill to the contact center at time needed 318.

Skill acquisition program 300 is variously embodied and may include various phases, such as phase 308, 310, 312 for third candidate 302; or single phase such as phase 1 (314, 316) for second candidate 304 and first candidate 306. In another embodiment the skill acquisition program 300 is evaluated at first midpoint 320 in terms of a skill acquisition. Optionally second midpoint 322 provides a second test to determine an observed midpoint proficiency at a second time. However it should be noted that second candidate 304 is evaluated at second midpoint 322 and omitted from observation at first midpoint 320. For example $2^{nd}$ candidate 304 may be a new hire and phase 1 (314) may be a recruiting program. In another embodiment first candidate 306 and third candidate 302 are presently agents of the contact center and subject to skill acquisition program 300 comprising a training program.

In another embodiment, at least two of candidates 302, 304, 306 may be subjected to different training programs, different recruitment programs, or similar training and/or recruitment programs with different starting points. The actual and/or observed trajectory need not be identical. Candidate 304 may start later, perhaps much later, than candidate 306. Evaluation at first midpoint 320, for candidate 306, and second midpoint 322, for candidate 304, may occur at the same time or at different times and comprise the same evaluation or different. For example, candidate 306 may be training to speak Italian and, as determined at first midpoint 320, has failed to meet the expected proficiency (e.g., basic sentence structure, basic vocabulary, etc.). Candidate 304 may be semi-proficient in Italian or have other associated language proficiencies (e.g., Latin, French, etc.). Candidate 304 may start at the same or different time than candidate 306 and be subject to the same evaluation or different. For example, at second midpoint 322 second candidate 304 may be expected to have an advanced vocabulary and/or proficiency in conjugating most conversational verbs. A deficiency, even if more advanced than another agent, such as candidate 306, may be used as a comparison or in absolute terms to determine if agent 304 is deficient and, if so, discontinue training.

Figure 4:
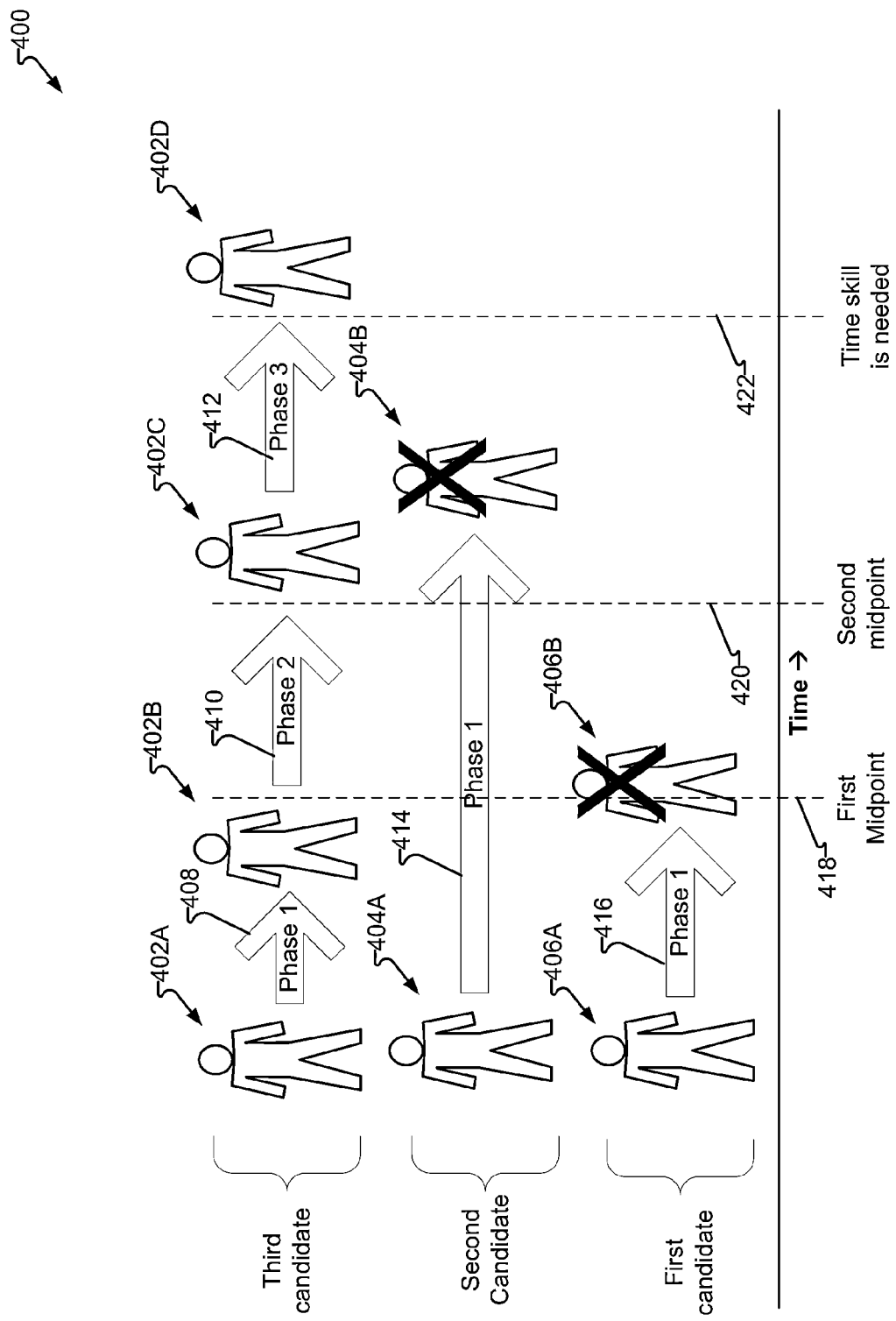
FIG. 4 illustrates a second skill acquisition program in accordance with embodiments of the present disclosure.

FIG. 4 illustrates skill acquisition program 400 in accordance with embodiments of the present disclosure. In one embodiment, skill acquisition program 400 is skill based "race." For example at first midpoint 418 and/or second midpoint 420 a candidate who is not obtained an observed skill proficiency, before at least one other candidate, may be discontinued from further skill acquisition activities. In one embodiment first candidate 406 is subject to skill acquisition program 400. First candidate 406, after phase 1 (416) becomes first candidate 406B having a sufficient observed skill proficiency. However, it is not until after first midpoint 418 that this proficiency is achieved. Alternatively, first candidate 406 does not become candidate 406B and, such as due to candidate 402B "beating" first candidate 406A to first midpoint 418. First candidate 406 may be excluded from further participation in skill acquisition program 400. Optionally, first candidate 406 may be reassigned other tasks.

Second candidate 404A is subject to skill acquisition program 400 to become second candidate 404B. Second candidate 404, following phase 1 (414) is not evaluated at first midpoint 418. At second midpoint for 422, candidate 404 is deemed to be deficient and therefore does not become candidate 404B or, alternatively, candidate 404B is determined to have the observed skill proficiency, but after second midpoint 420 and discontinued from further skill acquisition programs. Optionally, second candidate 404 may be reassigned other tasks.

In another embodiment third candidate 402 is subject to skill acquisition program 400 comprising phase 1 (408), phase 2 (410), and phase 3 (412). Third candidate 402A at first midpoint 418 has already achieved an observed midpoint proficiency, such as by "beating" candidate 406 to first midpoint 418 to become third candidate 402B, and therefore continues with skill acquisition program 400. Third candidate 402B continues to become third candidate 402C and has an observed midpoint proficiency at second midpoint 420 that is determined to be sufficient. Accordingly, third candidate 402C continues with skill acquisition program 400. The end result is third candidate 402D having needed skill 114 at time needed 422 and therefore provides needed skill 114 to the contact center.

Although the illustrations with respect to FIG. 2 and FIG. 3 incorporate three candidates, one of ordinary skill in the art will appreciate that the number of candidates may be any number of at least one. For example, a first candidate who does not achieve an observed midpoint proficiency that is determined to be sufficient may be reassigned without regard to other candidates.

Furthermore, as can be appreciated with three or more candidates, at least one candidate but less than all candidates, may be eliminated and/or permitted to continue the skill acquisition program depending on need. For example if only one candidate is needed to provide needed skill 114 than all but one candidate may be eliminated at a midpoint over a plurality of midpoints.

Figure 5:
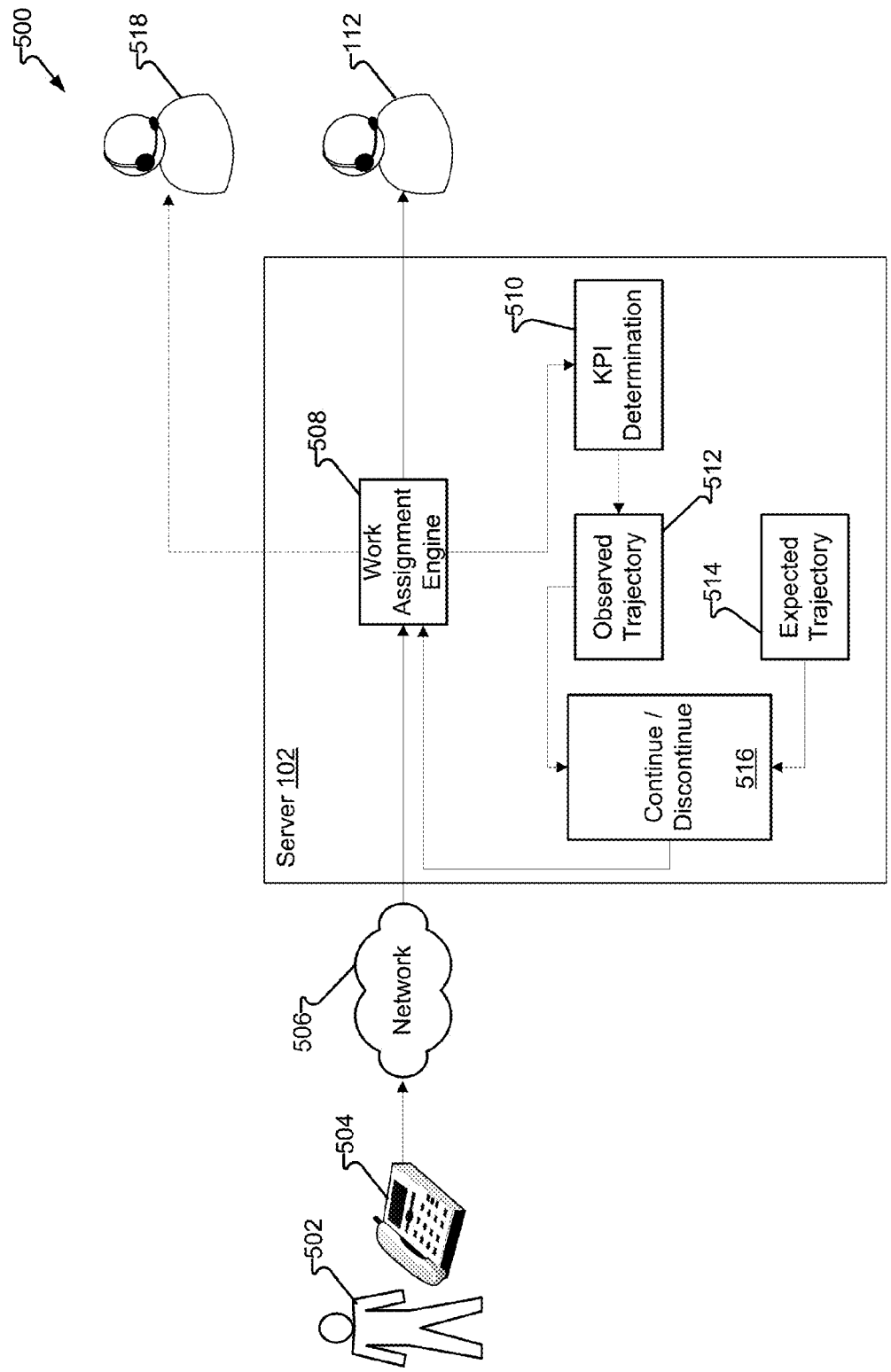
FIG. 5 illustrates a contact center in accordance with embodiments of the present disclosure

FIG. 5 illustrates contact center 500 in accordance with embodiments of the present disclosure. Contact center 500 incorporate server 102 and components therein. However it should be noted that other configurations, such as one or more of work assignment engine 508, KPI determination 510, observed trajectory 512 expected trajectory 514 and/or continue discontinue module 516 may be embodied as external to server 102 and in communication with server 102 and/or other components therein. Furthermore, the contact center 500 may be configured to implement any one or all of the programs 300, 400 described hereinabove.

In one embodiment, customer 502 uses endpoint 504 to access network 506 to communicate with contact center 500. Customer 502 may be associated with a work item for contact center 500. Endpoint 504 may be any electronic device or devices operable to place customer 502 in communication with contact center 500. Examples of endpoint 504 include, but are not limited to, a telephone (VoIP, PSTN, PBX, and/or other telephony device), a computer (laptop, desktop, tablet), and/or a smart phone (e.g., cellular phone, WiFi enabled portable device, etc.). The work item may be a communication in the form of voice/audio, video (video with optional audio), text, email, co-browse, or other means of communication over network 506. Network 506 may comprise a public network (Internet) and/or private network (WAN, LAN, cellular, etc.) operable to serve as an electronic communications conduit between endpoint 504 and agent 112, 518.

Work assignment engine 508 determines which agent of a plurality of agents (agent 112, agent 518, etc.) receives the work item for processing. In one embodiment work assignment engine 508 provides work items to agent 112 associated with the skill acquisition program. The performance of agent 112 in performing work items associated with skill acquisition program are determined by key performance indicator determination (KPI) 510. For example, agent 112 receiving a work item associated with learning a new skill associated with the needed skill may initially perform at a first level (e.g., omit necessary information, take longer than desired, errors, looking up additional information, asking for help, poor customer feedback, etc.). However, over time, KPI determination 510 should improve as agent 112 gains skills associated with the needed skill and the work item. The rate at which the agent 112 gains those skills is determined by observation observed trajectory 512. Server 102 comprises a memory integrated therein and/or accessible thereto. Expected trajectory 514, maintained in the memory, is accessible to continue/discontinue module 516.

Continue/discontinue module 516 determines if the observed trajectory 512 is equal to or greater than expected trajectory 514 at a midpoint. Based on the determination of continue/discontinue module 516 work assignment engine 508 is signaled to continue sending work items associated with the needed skill to agent 112 or to discontinue sending work items associated with the needed skill to agent 112. Work assignment engine 508 may, if discontinuing the sending work items to agent 112 in accord with the needed skill, send work items associated with the needed skill to agent 518. As a benefit server 102 may automatically determine if the skill acquisition program associated with providing work items associated with the needed skill 114 to agent 112 should continue not continue past a midpoint.

In another embodiment a supervisor is signaled by server 112 and/or a component therein such as continue/discontinue module 516 of a recommendation to continue or not continue sending work items associated with the needed skill to agent 112 to a supervisor. The supervisor may then approve override the recommendation.

The foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A server, comprising:
    a memory that stores accessible data and instructions;
    a network interface that interconnects the server to network components via a communication network; and
    a processor, coupled to the network interface and memory, that:
        accesses, at a first time and via the network interface, a needed skill for a contact center, a time needed for the needed skill to be available to the contact center, and a first estimated midpoint, selected from one of a skill-based midpoint and a time-based midpoint of a first skill acquisition program;
        accesses, by the network interface, a pool of candidates;
        selects a first candidate, from the pool of candidates, to provide the needed skill to the contact center upon completion of the first skill acquisition program;
        receives an observed midpoint proficiency of the first skill acquisition program, the observed midpoint proficiency being selected from one of an observed skill-based midpoint and an observed time-based midpoint selected in accord with the selected one of the skill-based midpoint and the time-based midpoint;
        compares the first estimated midpoint with the observed midpoint proficiency; and
        upon the compared first estimated midpoint and actual midpoint indicating a deficiency, discontinues the first skill acquisition program.

2. The server of claim 1, wherein:
    the first candidate is either (i) an agent of the contact center but does not possess the needed skill at the first time or (ii) is not an agent of the contact center at the first time.

3. The server of claim 1, wherein the skill acquisition program is a training program when the first candidate is (i) an agent of the contact center but does not possess the needed skill at the first time.

4. The server of claim 1, wherein the skill acquisition program is a recruitment program when the first candidate is (ii) is not an agent of the contact center at the first time.

5. The server of claim 1, wherein the first candidate is selected upon the processor determining the first candidate has an estimated skill acquisition trajectory indicating the needed skill will be acquired by the time needed.

6. The server of claim 1, wherein the processor further performs:
    accessing, via the network interface, records for each of the pool of candidates, the pool of candidates comprising at least the first candidate and a second candidate;
    determining, from the records, an estimated skill acquisition time for each of the pool of candidates; and
    the selecting of the first candidate for the skill acquisition upon determining the first candidate has the estimated skill acquisition time more closely associated with the time needed as compared to the estimated skill acquisition time of the second candidate.

7. The server of claim 1, wherein the processor further performs:
    wherein the first estimated midpoint is associated with the first candidate;
    the selecting further comprises selecting the first candidate and a second candidate having a second estimated midpoint; and
    the comparing, further comprises, comparing the first estimated midpoint with the second estimated midpoint; and
    upon the comparison favoring the first estimated midpoint, discontinuing the skill acquisition program with respect to the second candidate.

8. The server of claim 1, wherein the processor further performs:
    the selecting further comprises selecting the first candidate and a second candidate to provide the needed skill to the contact center upon completion of a second skill acquisition program;
    receiving an observed midpoint proficiency of the second skill acquisition program;
    comparing the observed midpoint proficiency associated with the first skill acquisition program with the observed midpoint proficiency of the second skill acquisition program; and
    upon the compared observed midpoint proficiency of the first skill acquisition program being inferior to the observed midpoint proficiency of the second skill acquisition program, discontinuing the first skill acquisition program.

9. The server of claim 1, wherein:
    the first estimated midpoint is one of a plurality of midpoints;
    receiving an observed midpoint proficiency further comprises receiving one of a number of observed midpoints proficiencies;
    comparing the one of the plurality of midpoints with an associated one of the number of observed midpoints proficiencies; and
    upon the compared one of the plurality of midpoints and the associated one of the number of observed midpoints proficiencies indicating a deficiency, discontinuing the first skill acquisition program.

10. A system for providing a needed skill to a contact center, comprising:
    means for accessing the needed skill, the time needed for the skill to be available to the contact center, and a first estimated midpoint, selected from one of a skill-based midpoint and a time-based midpoint;
    means for accessing a pool of candidates;
    means for selecting a first candidate, from the pool of candidates, to provide the needed skill to the contact center upon completion of the first skill acquisition program;
    means for receiving an observed midpoint proficiency of the first skill acquisition program, the observed midpoint proficiency being selected from one of an observed skill-based midpoint and an observed time-based midpoint selected in accord with the selected one of the skill-based midpoint and the time-based midpoint;
    means for comparing the first estimated midpoint with the observed midpoint proficiency; and
    upon the compared first estimated midpoint and actual midpoint indicating a deficiency, means for discontinuing the first skill acquisition program.

11. The system of claim 10, wherein:
the first candidate is either (i) an agent of the contact center but does not possess the needed skill at the first time and the skill acquisition program is a training program or (ii) is not an agent of the contact center at the first time and the skill acquisition program is a recruitment program.

12. The system of claim 10, wherein the means to select the first candidate further comprise means to select the first candidate upon determining the first candidate has an estimated skill acquisition trajectory indicating the needed skill will be acquired by the time needed.

13. The system of claim 10, wherein:
wherein the means for accessing records for each of the pool of candidates further comprises means to access records for at least the first candidate and a second candidate;
means for determining, from the records, an estimated skill acquisition time for each of the pool of candidates; and
means for selecting of the first candidate for the skill acquisition upon determining the first candidate has the estimated skill acquisition time more closely associated with the time needed as compared to the estimated skill acquisition time of the second candidate.

14. The system of claim 10, wherein:
wherein the first estimated midpoint is associated with the first candidate;
the means for selecting further comprises means for selecting the first candidate and a second candidate having a second estimated midpoint; and
the means for comparing, further comprises, means for comparing the first estimated midpoint with the second estimated midpoint; and
upon the comparison favoring the first estimated midpoint, means for discontinuing the skill acquisition program with respect to the second candidate.

15. The system of claim 10, wherein:
the means selecting further comprises means for selecting the first candidate and a second candidate to provide the needed skill to the contact center upon completion of a second skill acquisition program;
means for receiving an observed midpoint proficiency of the second skill acquisition program;
means for comparing the observed midpoint proficiency associated with the first skill acquisition program with the observed midpoint proficiency of the second skill acquisition program; and
upon the compared observed midpoint proficiency of the first skill acquisition program being inferior to the observed midpoint proficiency of the second skill acquisition program, means for discontinuing the first skill acquisition program.

16. The system of claim 10, wherein:
the first estimated midpoint is one of a plurality of midpoints;
means for receiving an observed midpoint proficiency further comprises receiving one of a number of observed midpoints proficiencies;
means comparing the one of the plurality of midpoints with an associated one of the number of observed midpoints proficiencies; and
upon the compared one of the plurality of midpoints and the associated one of the number of observed midpoints proficiencies indicating a deficiency, means for discontinuing the first skill acquisition program.

17. A processor configured to perform actions, comprising:
accessing, at a first time and via a network interface, a needed skill for a contact center, a time needed for the needed skill to be available to the contact center, and a first estimated midpoint, selected from one of a skill-based midpoint and a time-based midpoint of a first skill acquisition program;
accessing, by the network interface, a pool of candidates;
selecting a first candidate, from the pool of candidates, to provide the needed skill to the contact center upon completion of the first skill acquisition program and wherein the first candidate is either (i) an agent of the contact center but does not possess the needed skill at the first time or (ii) is not an agent of the contact center at the first time;
receiving an observed midpoint proficiency of the first skill acquisition program, the observed midpoint proficiency being selected from one of an observed skill-based midpoint and an observed time-based midpoint selected in accord with the selected one of the skill-based midpoint and the time-based midpoint;
comparing the first estimated midpoint with the observed midpoint proficiency; and
upon the compared first estimated midpoint and actual midpoint indicating a deficiency, discontinuing the first skill acquisition program.

18. The processor of claim 17, further performing:
accessing a skill retention level associated with completion of the training program; and
selecting the skill acquisition program in accord with an implementation date, whereby the skill acquisition program enables the first candidate to be an agent of the contact center and having the needed skill with the skill retention level on the implementation date.

19. The processor of claim 18, wherein the decision to discontinue the skill acquisition program further comprises a decision to select an alternative skill acquisition program.

20. The processor of claim 17, further performing:
the selecting further comprises selecting the first candidate and a second candidate to provide the needed skill to the contact center upon completion of a second skill acquisition program;
receiving an observed midpoint proficiency of the second skill acquisition program;
comparing the observed midpoint proficiency associated with the first skill acquisition program with the observed midpoint proficiency of the second skill acquisition program; and
upon the compared observed midpoint proficiency of the first skill acquisition program being inferior to the observed midpoint proficiency of the second skill acquisition program, discontinuing the first skill acquisition program.

* * * * *